United States Patent [19]

Kalantery

[11] Patent Number: 5,832,272

[45] Date of Patent: Nov. 3, 1998

[54] APPARATUS AND METHOD FOR PARALLEL COMPUTATION

[75] Inventor: Nasser Kalantery, London, United Kingdom

[73] Assignee: University of Westminister, United Kingdom

[21] Appl. No.: 525,630

[22] PCT Filed: Mar. 15, 1994

[86] PCT No.: PCT/GB94/00509

§ 371 Date: Oct. 27, 1995

§ 102(e) Date: Oct. 27, 1995

[87] PCT Pub. No.: WO94/22077

PCT Pub. Date: Sep. 29, 1994

[30] Foreign Application Priority Data

Mar. 15, 1993 [GB] United Kingdom .................. 9305263

[51] Int. Cl.⁶ ................................................ G06F 9/40
[52] U.S. Cl. ............................................................ 395/706
[58] Field of Search ............................................ 395/706

[56] References Cited

U.S. PATENT DOCUMENTS

| | | | |
|---|---|---|---|
| 5,088,034 | 2/1992 | Ihara et al. ............................ | 395/706 |
| 5,410,696 | 4/1995 | Seki et al. ............................. | 395/706 |
| 5,450,554 | 9/1995 | Zaiki ..................................... | 395/706 |
| 5,452,461 | 9/1995 | Umekita et al. ...................... | 395/706 |
| 5,634,059 | 5/1997 | Zaiki ..................................... | 395/706 |

FOREIGN PATENT DOCUMENTS 2 227 108   7/1990   United Kingdom .

88/02514   4/1988   WIPO .

OTHER PUBLICATIONS

IEICE Transations, vol. E 74, No. 10, Oct. 1991, Tokyo, JP, pp. 3105–3114, XP000279295, Hironori Kasahara et al., A Fortran Parallelizing Compilation Scheme for Oscar Using Dependence Graph Analysis.

Computer Architecture News, vol. 17, No. 3, Jun. 1989, New York, U.S., pp. 416–423, XP000035328, Hong–Men Su et al., on Data Synchronization for Multiprocessors.

The 15th Annual International Symposium on Computer Architecture, 30, May 1988, Honolulu, Hawaii, pp. 393–400, Andr Seznec et al., Synchronizing Processors Through Memory, etc.

*Primary Examiner*—Emanuel Todd Voeltz
*Assistant Examiner*—John Q. Chavis
*Attorney, Agent, or Firm*—Cesari and McKenna, LLP

[57] ABSTRACT

Data processing apparatus for the execution of a sequential program, comprising at least one memory and a plurality of parallel processors all connected for mutual transfer of messages under the control of a control system; in which the processors are programmed each with part of the sequential program, those steps of each part, which would access or modify a data variable, being serially labeled in accordance with the intended sequence of the whole sequential program; in which the control system is arranged so as to label every message intended to access or modify the memory with a label corresponding to the serial label of the program step from which the message is derived; and in which the control system is arranged, for the or each memory, to allow memory-accessing and modifying operations only in the sequential order of the serial labels on the messages.

17 Claims, 7 Drawing Sheets

| MESSAGE CONTENT | MEANING | RESULT |
|---|---|---|
| W n value | Write the given value to the location n | n = value. Write operation is complete |
| R n | Send me the current value of n | n is read A "V" message is then sent to the requesting node |
| V n value | n Now has this value: "value". This message is sent in response to an "R" message | A read operation is complete |

PROGRAM STRUCTURE

| LOOP | CLOCK STRUCTURE |
|------|-----------------|
|      | N   C   N   C   N   C |
| $I_0$ : | <0, $I_0$, 0, 0, 0, 0 > |
| $I_1$ : | <1, $I_0$, 0, $I_1$, 0, 0 > |
| $I_2$ : | <1, $I_0$, 1, $I_1$, 0, $I_2$> |
| $I_3$ : | <1, $I_0$, 2, $I_1$, 0, $I_3$> |
| $I_4$ : | <2, $I_0$, 0, $I_4$, 0, 0 > |
| $I_5$ : | <3, $I_0$, 0, $I_5$, 0, 0 > |
| $I_6$ : | <3, $I_0$, 1, $I_5$, 0, $I_6$> |

N = Loop Number
C = Loop Counter

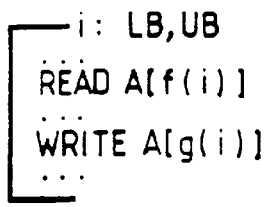
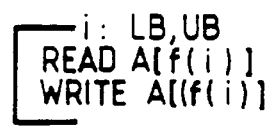
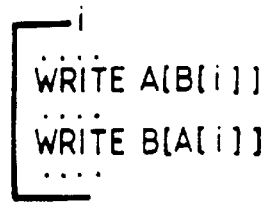
FIG.10(a)    FIG.10(b)    FIG.11
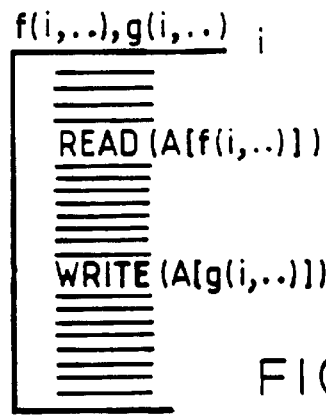
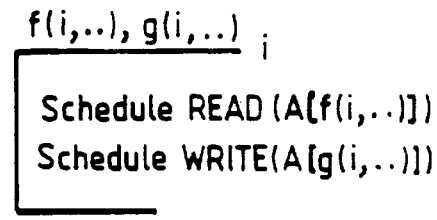
FIG.12(a)    FIG.12(b)
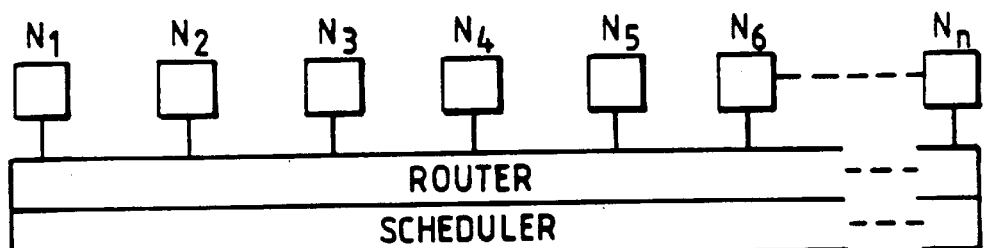
FIG.13(a)
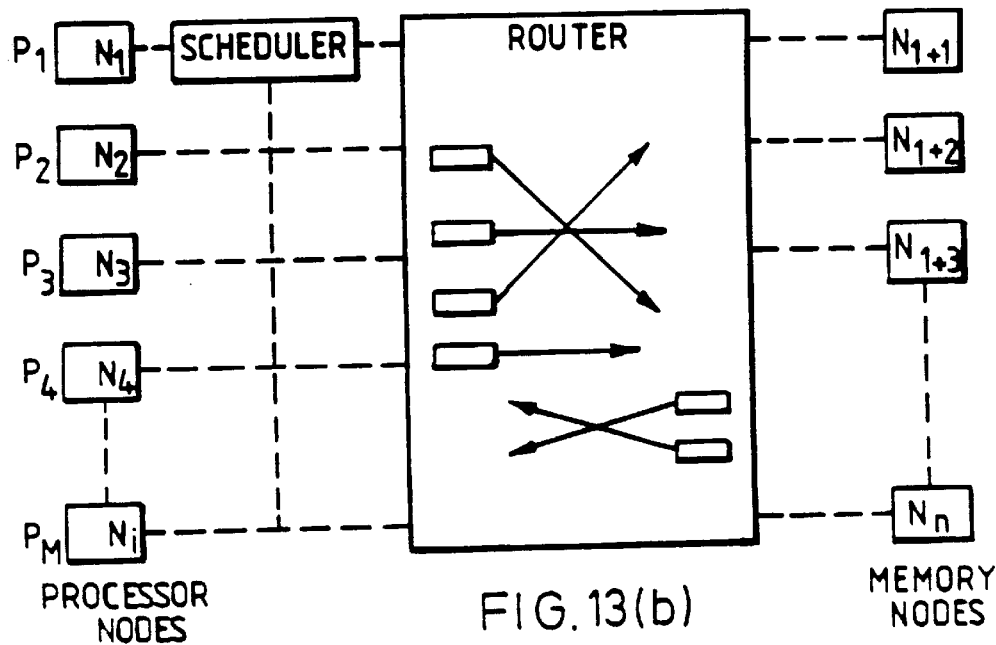
FIG.13(b)

APPARATUS AND METHOD FOR PARALLEL COMPUTATION

This invention relates to parallel computational methods and apparatus, to the way in which a sequential program is compiled for execution by parallel processors, and to the mechanism which co-ordinates the subsequent execution. The invention is applicable to any type of data processing, but it is particularly advantageous where computational speed is of the essence, for example large database searching, airline reservations, weather predictions, oil reservoir modelling, financial analysis and modelling, telecommunications switching networks, and in the human genome mapping project.

Parallel computation gives the theoretical possibility of almost unlimited improvement in execution time, but inevitably there will be some data sharing between the processors during run time, and it is essential to ensure the correct order of operations which interact with the same data variable.

The fundamental impediment in transition from a serial processing tradition to parallel processing is the absence of a unified program control mechanism for the latter. The Von Neumann type of computer achieves logical order and unity of the operations on the data through a sequence of execution steps conducted by a single program control unit. However, by their very nature, asynchronous multiple processor machines are deprived of that ordering mechanism. This gives rise to the principal problem of automatic program parallelisation. More than two decades of intensive research have been directed towards the resolution of this problem. Due to the independent and asynchronous nature of operations in a distributed environment, two "data-dependent" statements of a program have not been able to be parallelised, because this may have led to an indeterminate order of operations on the shared data and hence cause erroneous and invalid computations.

There are three types of data dependency in a sequential program: flow-, anti-, and output-dependency. A data variable, stored in a memory subject to accessing and modifying operations dictated by successive code statements S1 and S2, may be accessed (read) by S2 after it has been modified (written to) by S1, causing flow dependency in the code. If it is accessed by S1 and modified by S2, this causes anti-dependency. If it is modified by both S1 and S2, this causes output dependency. Thus "data dependency analysis" has been used to ascertain whether there exist blocks of code, within the program, which are not data dependent. Then and only then these blocks of code can be parallelised. Any risk of any type of data dependency means that parallelisation cannot be allowed. But accurate data dependency analysis, to assess the risk, is often difficult or not feasible. Hence, the basic rule of the current practice is: "When in doubt, do not parallelise". It means that existing automatic parallelisation schemes can achieve only a very limited degree of parallelism (References [1],[2],[3],[4],[13] and [14]).

Data dependency is also the main reason that parallelisation of object oriented programs, despite their obvious aptitude for distributed execution, has remained largely a research topic [4]. Objects communicate through "methods", i.e. data is accessed only in the form of procedure calls. This implies that parallelisation of the program will involve "inter-procedural analysis", which forces invariably conservative assumptions on the parallelising compilers [5],[14].

On the other hand, explicit parallel programming can be tedious, time-consuming and prone to errors. Parallel realisation of an application exhibiting non-trivial, data-dependent parallelism can readily expand into network management and operating system issues. Organisation of deadlock-free communication and synchronisation can get the application programmer entangled in a cross-disciplinary activity which leads away from the original objective of the exercise: to write a workable (and hopefully faster) application [4],[6],[7].

The purpose of the invention is to exploit as far as possible the inherent advantages of parallel computation unhindered by the fear of possible data-dependency problems, and to implement a conventional sequential program in a parallel computation environment without the need to undertake explicit original programming of the parallel processes.

Accordingly, the invention provides data processing apparatus for the execution of a sequential program, comprising at least one memory and a plurality of parallel processors all connected for mutual transfer of messages under the control of a control system; in which: the processors are programmed each with part of the sequential program, those steps of each part, which would access or modify a data variable, being serially labelled in accordance with the intended sequence of the whole sequential program; in which the control system is arranged so as to label every message intended to access or modify the memory with a label corresponding to the serial label of the program steps from which the message is derived; and in which the control system is arranged, for the or each memory, to allow memory-accessing and modifying operations only in the sequential order of the serial labels on the messages.

In this specification, the term "messages" is intended to include data and instruction packets or tokens or any form of transferred information (in shared memory, for example, the information is transferred by reading and writing from and to a common memory part).

The invention also provides a method of executing a sequential program, comprising:
labelling those steps of the sequential program, which would access or modify a data variable, with a serial label in accordance with the intended sequence of the program;
parallelising the sequential program to derive a plurality of separate program segments, each step of which segments, which would access or modify a data variable, has a serial label corresponding to the serial label of that step in the original sequential program; and
running the program segments in parallel on parallel processors under a control system which ensures that all memory-accessing and -modifying operations are executed only in the sequential order of the serial labels on the corresponding steps.

The invention also provides data processing apparatus for parallelising compilation of a sequential program, comprising means for reading the program code, a counter for applying a serial label to each statement of the program code which would access or modify a data variable, the label being indicative of its intended order of execution, and storing the label with the statement, means for decomposing the program into code segments intended for execution by respective parallel processors, according to predetermined parallelisation algorithms stored in the data processing apparatus, and output means for providing as an output the serially-labelled code segments suitable for execution, in parallel, by processors controlled to respect the serial-labelling at every memory unit which might be accessed or modified when the parallel processors run the code segments, allowing memory-accessing or modifying operations only in the sequential order of the serial labels on the originating statement.

The invention also provides a method of compiling a sequential program for execution by parallel processors, comprising reading the program code, applying a serial label to each statement of the program code which would access or modify a data variable, the label being indicative of its intended order of execution, and storing the label with the statement, decomposing the program into code segments intended for execution by respective parallel processors, according to predetermined parallelisation algorithms stored in the data processing apparatus, and providing as an output the serially-labelled code segments suitable for execution, in parallel, using processors controlled to respect the serial-labelling at every memory unit which might be accessed or modified when the parallel processors run the code segments, allowing memory-accessing or modifying operations only in the sequential order of the serial labels on the originating statement.

The invention also provides a method of parallel computation in which the program code, executed in local parallel processors accessing and modifying one or more global memories, includes a serial label associated with each code statement which would access or modify a data variable, the label being representative of the sequential order of execution of that statement in an equivalent sequential program which would always produce the same results as the parallel computation, comprising, for each global memory, reading the serial labels of all the messages from the processors instructing access or modification of the memory, and allowing such access or modification only in the (non-decreasing) sequence of the serial labels, irrespective of the actual time of receipt of such messages.

The invention also provides a parallel computation system comprising parallel processors storing their own program code which may access and modify one or more memories common to two or more processors, a serial label being stored in association with each statement of the program code which would access or modify a data variable, the label being representative of the sequential order of execution of that statement in an equivalent sequential program which would always produce the same results as the parallel computation; and a control system arranged, for each common memory, to read the serial labels of all the messages from the processors instructing access or modification of the memory, and for ensuring their execution only in the sequence of the serial labels, irrespective of the actual time of receipt of such messages.

The preferred implementation of the invention is a virtual Von Neumann machine, with a concurrent multi-processor execution. environment, which is presented to the user as indistinguishable from a serial single-processor environment, providing a transparent parallel execution environment. This provides improved computational speed and/or a geographical distribution of processors if required. An example of this is now described, and the underlying control principles are illustrated, with reference to the accompanying diagrams, which:

Figure 14:
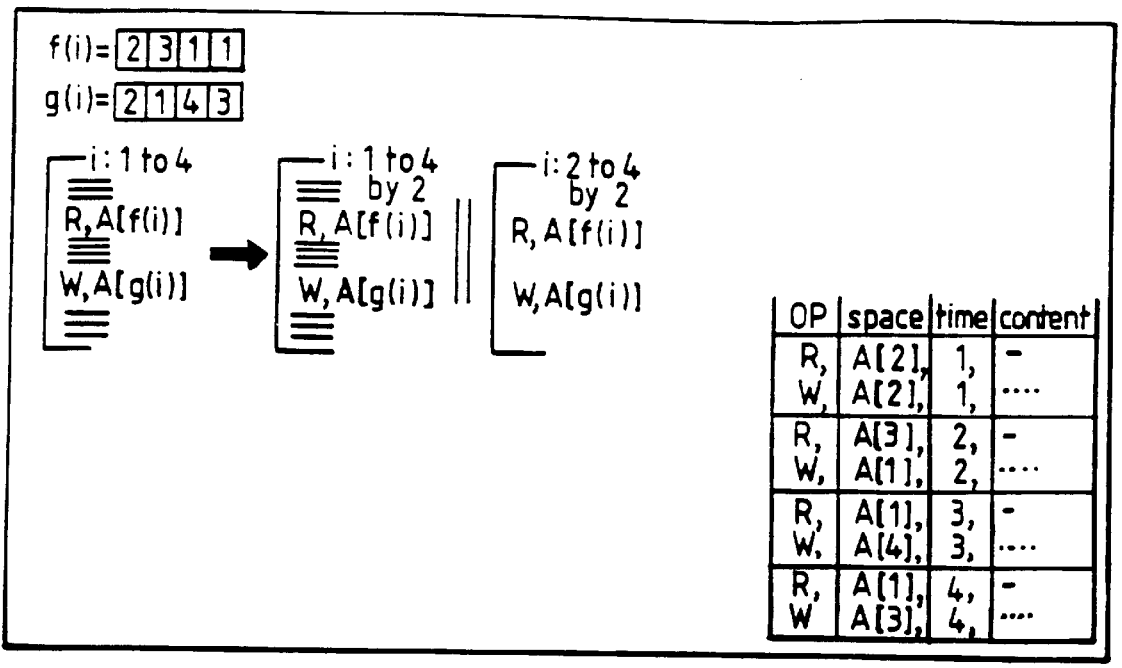
Figure 15:
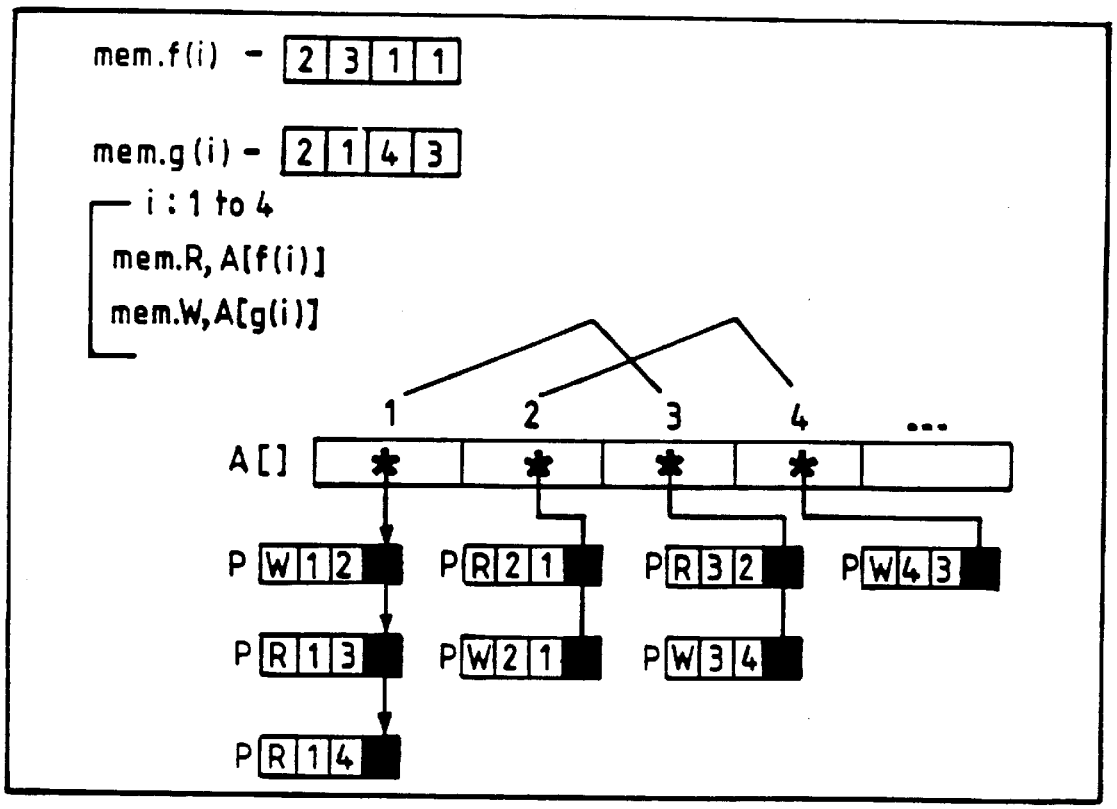
Figure 16:
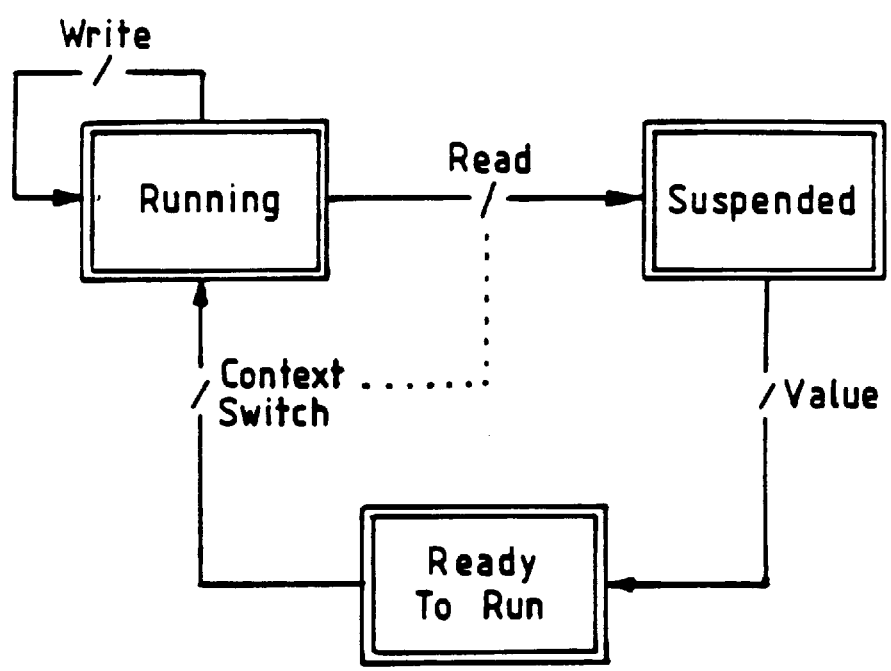

FIGS. 9($a$) and 9($b$) illustrate respectively a conventional sequential program and an additional specification of the partitioning strategy by means of "CUT" statements;

FIG. 10($a$) shows a program consisting of a single loop, and FIG. 10($b$) shows a corresponding skeleton of the loop;

FIG. 11 represents a loop in program code, with dynamic dependency;

FIGS. 12($a$) and 12($b$) are generalised models respectively of a processor and of corresponding self-ordering active memory;

FIGS. 13($a$) and 13($b$) are equivalent schematic diagrams of memory nodes and the associated router/scheduler modules;

FIGS. 14 and 15 illustrate the use of Lookahead (i.e. indirection) functions for event pre-scheduling in active memory, with FIG. 14 showing the parallelisation of complete code of a sequential loop into two interleaving parallel loops and showing the messages corresponding to the read and write operations, and FIG. 15 showing the pre-scheduling of those operations in self-ordering active memory; and FIG. 16 illustrates task scheduling policy at processor nodes by showing task(referred to later also as process-clock or p-clock) state transitions occurring in a processor node.

Figure 1:
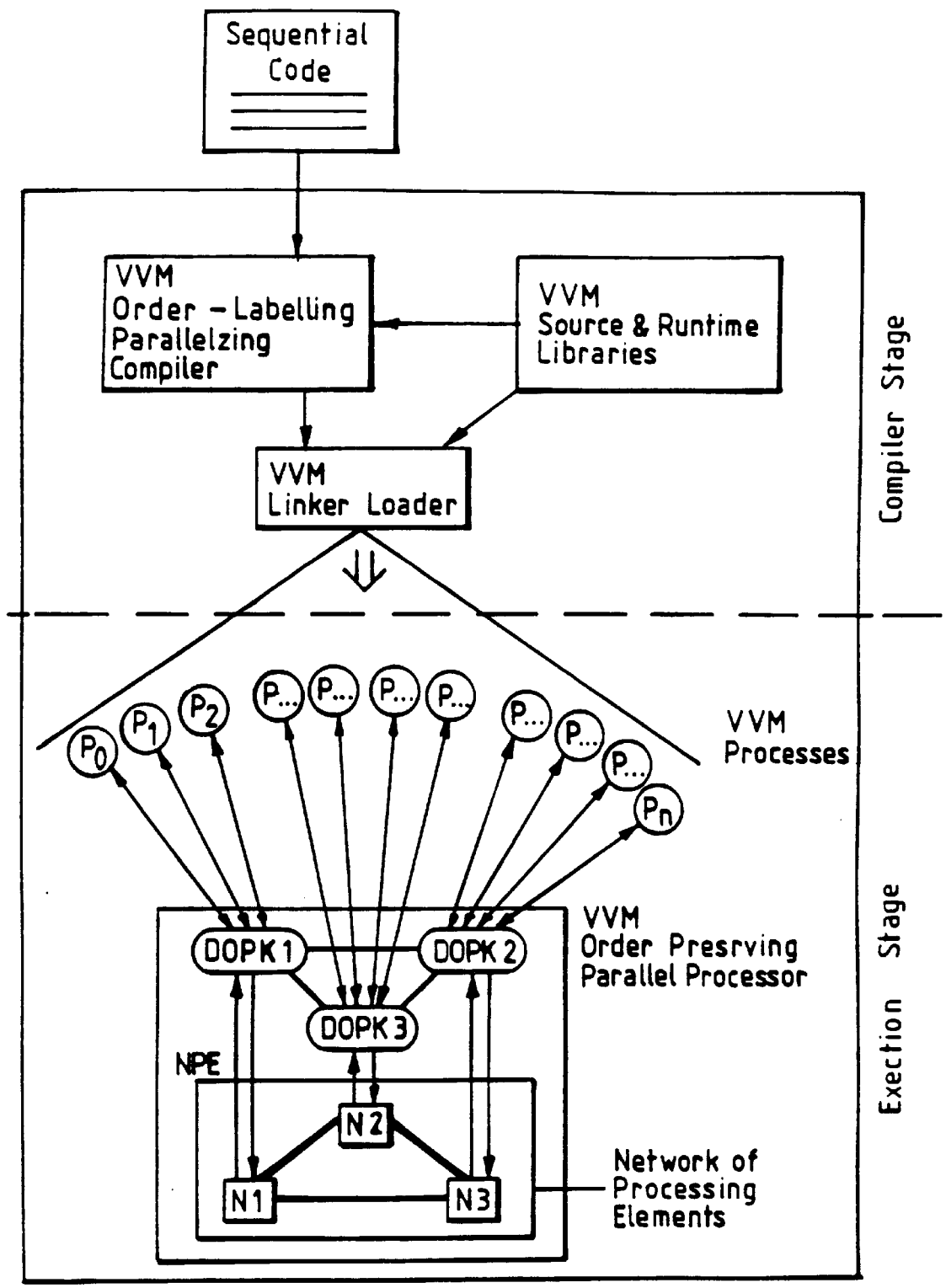
FIG. 1 shows a virtual Von Neumann machine embodying the invention, for compiling input sequential code and executing it with parallel processors.

The virtual Von Neumann machine (VVM) of FIG. 1 has an input for sequential code, usually a single sequential program, but alternatively a number of programs written explicitly for asynchronous parallel running and intended for further parallelisation. Alternatively, a number of sequential programs can run simultaneously on the same virtual machine.

A VVM compiler, with access to internal VVM libraries of the programs necessary for compilation, is loaded with the sequential code, and undertakes serial labelling of the code statements, as explained in greater detail below. The compiler decomposes the sequential code into multiple segments (not necessarily comprising contiguous code), as instructed by the CUT statement (FIG. 9), and compiles those segments for corresponding parallel processors, in accordance with conventional algorithms for program transformation. A VVM linker-loader then assigns the compiled code segments, each still carrying the serial labels, to respective parallel processes Po–Pn to be carried out by parallel processors. The parallel processors in this case are transputers represented as MIMD (multiple instruction multiple data) hardware. It will however be appreciated that any part of the VVM machine may be implemented in software or hardware: the intention is to develop highly integrated special purpose hardware for the entire machine, but the machine is capable of implementation on conventional software or hardware. The VVM machine has a control system (not shown explicitly) which underpins the VVM distributed order-preserving kernel (DOPK). This preserves the correct sequence of operations on each data variable which are dictated by the parallel processes during execution.

Figures 2, 3:
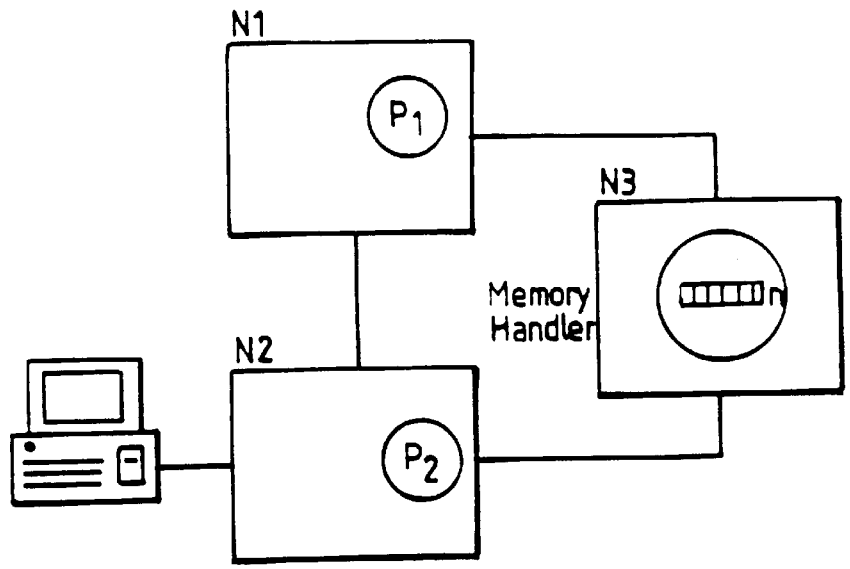
FIG. 2 is a diagram of a three-node network for illustrating the invention.
FIG. 3 is a table explaining, for one particular protocol, the three types of message which are sent between nodes of a network of processors and memory handlers such as that of FIG. 2.

This control system exploits research already completed on parallel discrete event simulation (PDES), not previously linked with automatic program parallelisation. It reads the serial labels from messages transmitted from processors to memory handlers for accessing or modifying a data variable stored in the shared memory, and it ensures that the operations are performed in sequence according to those labels. The distributed program control mechanism can be implemented on shared or distributed memory MIMD machines. However, for the sake of simplicity, the following examples assume a 3 node message-passing, distributed memory hardware architecture, which is illustrated in FIG. 2.

Assuming that the two concurrent processes P1 and P2 are being executed on N1 and N2, at some point in their execution, both P1 and P2 will try to read from or write to a memory location n at N3.

In a message passing architecture, a read or write operation from or to a remote memory location is realised by an exchange of messages to a process which handles that memory location. The content of these messages is denoted as shown in FIG. 3. Thus a write-operation consists of one message sent to the memory controller. A read-operation consists of two messages exchanged between reader and memory (other protocols may involve a different number of types of message).

The conventional architecture of this type does not provide any facility to ensure that a certain read or write operation will occur before or after another one. Therefore, the end result of operations on shared data becomes non-deterministic.

For example, conflicting messages

"| W | n | 5 |"

and

"| W | n | 3 |"

might be sent respectively from $N_1$ and $N_2$, and the end result might be either 3 or 5 for the data variable n, depending on the order in which the messages arrived. As another example, $N_1$ might send "| R | n |"

and $N_2$ might send

"| W | n | 3 |"

to the same memory handler $N_3$, previously storing "O" for data variable n. The value of n read and sent, as a message "| V | n | (value) |", to $N_1$, might be either 0 or 3, again depending on the order of messages received.

To resolve this data dependency problem, serial labelling is applied during compilation, and is preserved during parallel execution.

Figure 4:
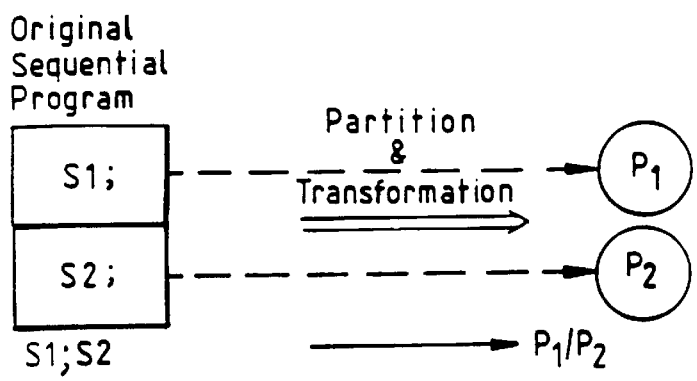
FIG. 4 is a diagram illustrating the partitioning and transformation of code of an original sequential program to code for parallel processes.

Supposing that P1 and P2 represent two halves of a sequential program which has been parallelised in the manner shown in FIG. 4.

In the original program, S1 would always be executed before S2 and hence the read/write operations on n would also happen in that order.

When the program is parallelised, P1 and P2 are preferably to execute concurrently so that the same computations can be achieved in a shorter time.

To achieve an orderly concurrent execution, where shared data is accessed and modified in the same order by the parts of the program as in the sequential execution, the following steps are carried out:

1. Label all the statements (or at least those which would involve accessing or modifying a data variable) of the sequential program in their sequential order.
2. Let parallel processes resulting from the decomposition-compilation process inherit the serial labels of the statements in corresponding sequential code segments.
3. During the execution, ensure that all memory access/modify operation messages by the parallel processes carry the label of the process with them.
4. At memory-access points, i.e. where an access/modify message is committed to the memory-handlers, ensure that messages are delivered in increasing serial-label order.

Steps 1 and 2 are carried out at the compilation time, while steps 3 and 4 are realised by one of the two well-known order-preservation protocols: the conservative one, "block and resume" protocol and the optimistic one, "look ahead and roll back" protocol. These are described in References [8] through to [12], and will not be elaborated upon here.

Labelling of the more complex sequential code structures such as loops will now be described briefly. Basically, the loops, which may be nested, are analysed and labelled during compilation, and the serial label for the code includes the loop labelling.

Loops constitute the computation-intensive part of the program and loop parallelisation is the crucial factor in achieving higher performance. On the other hand, any non-looping statement of a program can be viewed as a loop with only one iteration. Therefore, discussion of general program parallelisation can be reduced to discussion of general nested loop parallelisation, without restricting the conclusions of the discussion to be looping sections alone. For convenience, all loops will be specified as counter loops of the C or Pascal "FOR loop" type. A conditional "WHILE" loop can be viewed as a "FOR" loop with its upper bound value set to infinity, and the termination condition moved into the body of the loop. Thus, the statement: WHILE (NOT condition) DO ( ... loop body ... ) is equivalent to: FOR (i=O; i<∞; i++) (if (condition) break; ... loop body ... ).

Thus a conditional loop can easily be converted to a counter loop by setting the bound value of the counter to infinity and transferring the convergence condition into the body of the loop. In extracting the clock system, only the loop control structures of the program and the inter-relationships between the loops are needed. Therefore, ignoring irrelevant detail, a loop can be represented by means of the graphical notation $[^I$. Using this notation, interrelationships between multiple loops constituting a sequential program can be described.

Figure 5:
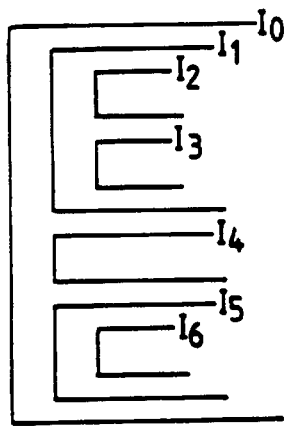
FIG. 5 is a diagram illustrating the clock structure of a nested loop in program code.

FIG. 5 illustrates a program structure and corresponding system of clocks which has been extracted. $[^I n$ represents a counter loop of the form:

```
for (Iₙ = base; Iₙ < bound; Iₙ + = step)
(
    if (condition) break;
    loop-body-statements;
)
``` where base, bound and step are integer values.

As FIG. 5 indicates, loop $I_0$ encloses all other loops. Loops $I_2$ and $I_3$ are nested in loop $I_1$, but are not nested with respect to each other. $I_3$ is therefore "consecutive" with respect to $I_2$. Loop $I_4$ is enclosed only by loop $I_0$. Loop $I_5$ is in the same nesting level as loops $I_1$ and $I_4$ and is consecutive with respect to them. Loop clocks presented in the same figure illustrate a simple way of building and initialising the clock system to reflect the sequential execution order of individual iterations of each loop. In this method, each loop is represented by a distinct clock (in effect each additional loop introduces a further timing axis and hence calls for the creation of a new clock) and the nesting of the loops is reflected in the creation of a hierarchical system of clocks such that the outermost nesting level takes the most significant position and the innermost nesting level takes the least significant position in the timing system. It should be noted that $I_0, I_1, I_2, I_3, I_4, I_5$ and $I_6$ are loop-counter variables and would assume numerical values once the execution starts. A clock is represented by two fields. The first field (N) is static and will remain the same throughout the execution. It indicates precedence relations of consecutive loops within the same nesting level. The second field (C), which is dynamic, represents the value of the loop counter. The advantage of this scheme is that it directly mirrors the program structure. However it carries redundant information and may benefit from further manipulation, so that the same information could be compressed into a smaller space.

The value of the field N of a given clock is determined at the compile time, to indicate the intended order of execution of the associated loop with respect to other loops within the same nesting level. The value of the field C will emerge at the run-time. As and when program execution causes loop-counter update, the logical clock of the loop will accordingly get updated and hence the sequential order of the current iteration will be reflected in the value of its clock and in the time-stamp (serial labelling) of messages resulting from the related computations of the iteration.

Figure 6:
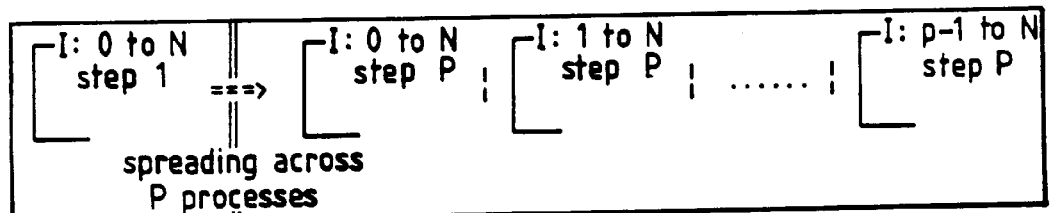
FIG. 6 is a diagram illustrating the partitioning, in accordance with FIG. 5, of an original loop into p loops with a step size of p.
Figure 7:
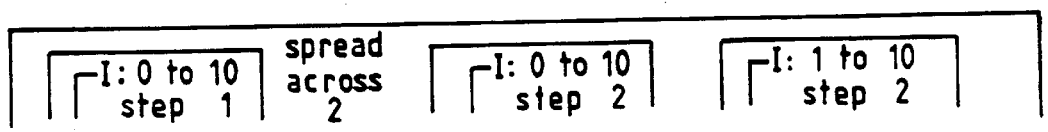
FIG. 7 is a diagram illustrating the partitioning of an original loop into two loops of step size 2.

Once the temporal coordinate of the program is extracted, the program can be partitioned and transformed into a multiplicity of parallel processes. A possible way of loop distribution is to assign interleaving iterations to consecutive processes. For example, given p processes, the nth process is assigned iterations n, n+p, n+2p, n+3p and so on. Thus a loop of the form illustrated in FIG. 6, after distribution across p processes, may be transformed to p loops of the form given in the FIG. 7.

The end result of this process is transformation of loops into independent processes, where each process carries its simple or nested logical clock initialised as described in the previous paragraphs.

Figures 8, 9A, 9B:
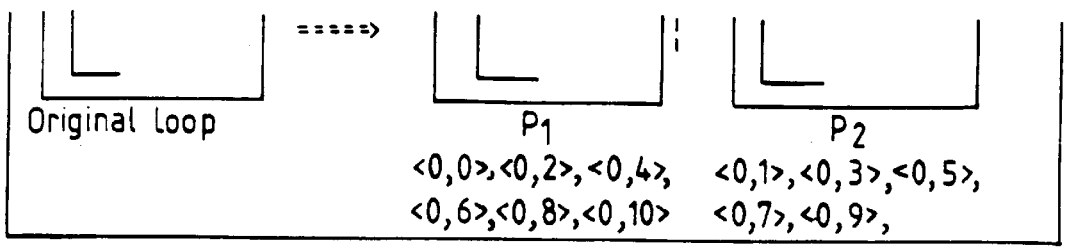
FIG. 8 is a diagram illustrating the partitioning and transformation of a loop into two parallel processes, showing the clock values in the two interleaving loops.

In the simple example of FIG. 8, a sequential code comprising loop I has been partitioned and transformed into two parallel processes P1 and P2. In the original loop, counter I would take all the values from 0 to 10 (i.e. 0, 1,2,3,4,5,6, 7,8, 9, 10). However, because of the initial values of I and its step values in P1 and P2, the counter values in P1 and P2 will be as below:

at P1: I=0, 2, 4, 6, 8, 10
at P2: I=1, 3, 5, 7, 9 and the initial format and the value of logical clocks at both processes will be (0,I). A message sent by the first iteration at P1 will carry time-stamp (0,0) while a message from first iteration of P2 will be stamped (0,1).

Branches, i.e. "if-then-else" constructs, are implemented as follows:

the branch which is selected executes normally, and the branch which is "not selected" executes a no-operation step, which results in the sending of no-op messages to remote memory locations which otherwise would be referenced by the unselected code segment. This avoids deadlocks occurring in the execution.

In the case of nested loops, such as loop $I_2$ within loop $I_1$ within loop $I_0$, the message label " | $I_0$ | ... | $I_1$ | ... | $I_2$ | ... | message | "

where message is for example W n 3, could have become long, incurring higher communication overheads. This is remedied here by giving the serial label a hierarchical or nested format. For instance a message from P1, when i is 4, would be as follows:

" | i | 4 | message | ", where

| message | is one of the three formats illustrated in FIG. 3.

The serial label of the message sent by P1 in FIG. 8 when i=2 and j=3 will be: "i 2 j 3 message ", where:

i and j represent the static part of the label, while
2 and 3 are the values of the counter variables at loops
i and j and are dynamic, i.e. they change during the execution of the program in P1.

Compilation, shown schematically in FIG. 1, will now be analysed in greater detail.

A sequential program, prepared for execution in the proposed environment, is partitioned by the programmer or by a higher level compiler, to a set of "sequential-cuts". A sequential-cut may have its own private data which are placed in the local passive memory. Data common to two or more sequential-cuts are placed in the self-ordering memory. Although all the cuts will be executed concurrently, there is no need for explicit synchronisation. All aspects of communication and synchronization amongst program segments can be carried out by the machine, automatically. FIGS. 9(a) and 9(b) illustrate this programming model. FIG. 9(a) shows a conventional sequential program. FIG. 9(b) represents the "parallelized" version of the same program. The only difference between the two programs is the additional "CUT" statements in the parallelized version. Explicit partitioning of the program by the insertion of the "CUT" statements allows the programmer, or a parallelizing compiler, to partition the program for optimal granularity and optimal exploitation of natural parallelism in the program. Thus the syntactical structure of a sequential program partitioned in the above-mentioned manner can be used to derive an abstract serial coordinate or a logical time system for that program. (The concept of logical time bears no direct relation to physical time. It is derived from the more basic concept of the logical serial order in which computations are meant to occur. This order is simply and readily implied by the sequential structure of the application programs. This should be understood in relation to the serial labels or time stamps referred to throughout the present specification). Transferred to the parallelized version of the program, logical time, the equivalent of simulated time in PDES, can then be used to mark read/write messages with appropriate time-stamps (serial labels). The remote memory can then be implemented, for example, as an optimistic order-preserving process to preserve the intended logical order of operations on data irrespective of the physical order in which messages arrive. The memory treats each data item as a pointer to a time-ordered list of values, in much the same way as state variables are implemented in PDES systems.

Discrete event simulation programs are characterised by their dynamic precedence relations. For example, in a DES program, the precedence relation, amongst the computations produced within a loop, may not be given by the order implied by the loop control construct. Instead, the execution order of a computation is determined by its occurrence-time which may be totally independent from the serial order implied by the program structure. Also, time in DES systems evolves stochasticaly and the occurrence-time of a computation (e.g. a procedure call) cannot be determined a priori. Therefore, current distributed order preservation strategies implemented for PDES systems are adapted to situations where precedence relations cannot be determined until after they have emerged during the execution of the program. Therefore either a continuous run-time scanning of the simulated time (by exchange of null messages) is used to ensure that an ordering error will never happen (the conservative approach) or, instead, to save on the scanning costs, ordering errors are allowed to happen but provisions are made to detect and rectify them as and when they do (the optimistic approach). The need for a continuous search of the time domain in the conservative approach means that efficient execution is possible only if the search space is kept small. The notion of "lookahead ratio" provides a quantitive measure of the search space. Lookahead refers to the lower bound on the time span between two consecutive computational activities. If, after each lookahead period, a computational activity is found then the lookahead ratio is 1 to 1. But, since the lookahead is the lower bound on inter-activity period, it may happen that many lookahead periods are checked without encountering a computational activity. Hence the notion of lookahead ratio, which is the ratio of lookahead to the mean inter-activity period. Conservative synchronization of an application exhibiting 1 to 1 lookahead ratio would be achieved with no extra costs at all (compared to the sequential simulation). But as the lookahead ratio is reduced, synchronization cost increases because now more and more search and test operations have to be made before a program activity can be found. Lookahead ratio of zero leads to complete deadlock, because the mechanism can never proceed to a next test point in the temporal search-space.

Optimistic synchronisation offers a more efficient and general purpose synchronization for stochastic time systems.

Optimistic order-preservation strategy offers the most generalized of the algorithms for this purpose. However, optimistic order preservation introduces extra overheads which should be avoided whenever possible. Using optimistic algorithms, the parallel tasks need to save their current state at each of the remote-read points. Also, scheduling of multiple tasks on each processor needs to be prioritized, such that always the ready-to-run task with the smallest clock value is executed. These requirements mean that parallel execution must compensate for such extra overheads. PDES experience indicates that, despite such overheads, optimistic execution can and does yield high speed-ups. The attraction of the optimistic method is that it does not require any lookahead, which in some cases may be difficult to obtain. Empirical studies of Fortran programs suggest that sequential Fortran programs do offer an enormous amount of lookahead at execution time. This lookahead could be used to achieve deterministic execution, without the need to pay for the costs of the optimistic methods. The nature of this lookahead and its exploitation at the order preserving memory, will now be discussed.

Most sequential programs have static precedence relations (or a static temporal graph) amongst their computation steps which can be determined at the compile time. This knowledge eliminates the need for an exhaustive search or for incurring state saving costs which are inevitable when the parallel execution involves dynamic precedence relations. To illustrate this point, FIG. 10(a) shows a program which consists of a single loop. For such a program, logical time consists of variable i alone. In each iteration of the loop there is a remote-read and/or a remote-write event, occurring at a time i, so that the event will be time-stamped i. It is known a priori that the event which happens at iteration i=x, will have precedence over the event occuring at iteration i=y, if y>x. (This precedence relation is distinct from a discrete event simulation program where an event generated at i=x may or may not have precedence over an event generated at i=y, irrespective of the values of x and y).

Conventional sequential programs have a static precedence graph. Static precedence relations mean that by communicating a skeleton copy of the loop consisting of loop control construct and remote read/write events and respective indirection functions to the memory, the time stamp and the type of the future events in the memory are predictable. FIG. 10(b) illustrates the skeleton of the loop and the remote read/write events which can be communicated to the memory before the loop execution is entered. Note that a conditional statement within a loop may or may not happen, but a priori it is predictable, if it happens, in which sequential step this would be. The conditional events are compiled such that if they were not selected for execution, their occurrence is replaced by a corresponding no-operation message to the memory.

Despite their static temporal graph, sequential programs often exhibit dynamic dependency relations. Dependency relations are of a spatial nature. The dependency graph of a program shows which memory location (i.e. a spatial point) will be accessed by a given computation step. The precedence graph or serial order of a program shows which computation is to happen before or after another one. However, dynamic dependency relations imply that it is not known, at compilation time, which memory cell is going to be affected by a given program segment and which program segment is going to be affected by a given memory cell. This point is also illustrated by the above example. Both READ and WRITE events at each iteration relate to a cell in the array A. However, it is not known which element of the array A will be affected until indirection functions f() and g() are solved. (The word "function" is used here in the broad sense of the word, i.e. it could be an input, a single variable, an array element, a linear function of the form ai+b or any other computable discrete function). It is often the case that these functions cannot be solved at compile time, because they require some parameters which become available only at run time. Thus they can be said to represent a dynamic dependency graph. It is in such cases that no compile time technique can parallelize the program into multiple independent segments, which in the case of the above example are parallelised into multiple independent iterations, and as explained further in references [16],[17]. Parallel realization of dynamic dependency graphs is in general a non-trivial activity and, because one cannot guarantee beforehand that a variable will be assigned only once, it is at odds with both single assignment and PRAM-CREW (parallel random access memory—concurrent read exclusive write) programming models. The main challenge in developing a general purpose order-preserving memory is to achieve efficient run-time resolution of this kind of dependencies without constraining the available parallelism.

A common feature of most dynamic dependency relations is that the dependencies are characterized by a known space-time correlation. For instance, in many numerical algorithms, array indices (i.e. space) are a function of the loop iteration counter (i.e. time). In other words uncertain or dynamic dependencies are characterized as some discrete computable function of the iteration counter (i.e. time). At some point during the execution the parameters required for the solution of the indirection function becomes available. This creates an opportunity for the order-preserving memory to use the space-to-time transformation of the function to predict and resolve the dynamic dependencies efficiently, avoiding extra overheads which are associated with the optimistic execution.

The previously quoted study by Shen et. al. found that in the great majority of cases the dynamic or uncertain dependencies are the result of array subscripts which are in the form of ai+b. It was also observed that in over 80% of the cases "a" is either 0 or 1. The next most common form of the indirection function was found to be an array subscript which itself is an element of an array. In principle, a loop, with a dynamic dependency graph and a great deal of potential parallelism, may not offer an indirection function which can be solved prior to the execution of the loop itself. The example shown in FIG. 11 offers one such possible case. In this example B[ ] and A[ ] are involved in a reciprocal relationship: B[ ] acts as the indirection function for A and vice versa. In such cases, no lookahead is available to the memory and therefore the optimistic method must be used to achieve effective parallel execution.

However, for the loops with known Lookahead function, the active memory can be given the "skeleton" of the loop. The "skeleton" of the loop means all its indirection functions, control constructs and remote read and write events. Hence the memory can predict and pre-schedule read and write events at the affected location, independently of the task processes. Pre-scheduling of Read and Write events into their respective "locations" is interleaved with the reception of Write messages from task-processes. When a Write message arrives, it triggers the "value" messages for all the pre-scheduled Reads for which it is the "latest" Write in logical time. When Read messages are pre-scheduled, appropriate care is taken such that if the "latest" Write message is already there then the pre-scheduling results in the immediate transmission of the "value" message, in response to the predicted Read. Take for example the sequence of events E1 to E5:

E1: PW
E2: PR
E3: PR
E4: PW
E5: PR for a particular memory location. If a real Write message arrives to replace E1, when the read messages are already scheduled, then E2 and E3 will cause triggering of value messages, and will be removed from the list. E5 however will not be triggered, because it is guarded by a pre-Write event E4 for which the Write message has not yet arrived.

Take for another example:

E1: W and a pre-Read message arrives, after the "latest" Write message E1 has arrived. Scheduling of the pre-Read event therefore results in the immediate transmission of the corresponding value message.

These operations are made possible by the fact that scheduling of events into location lists implies a search operation through the list, the list starting with the event with the lowest time-stamp and being ordered in increasing time-stamp order.

To summarise, sequential loops can be classified into three categories:
1) Loops with static and unambiguous dependencies. These loops are parallelized efficiently at compile time.
2) Loops which do not offer static and unambiguous parallelism at compile time which are called run time parallelizable loops (RTP). RTP loops themselves fall into two categories:
   2.1 RTP with Lookahead
   2.2 RTP without Lookahead.

RTP loops without Lookahead can achieve parallel execution through optimistic memory option. RTP loops with Lookahead can achieve parallel execution through Lookahead memory option.

The algorithm for optimistic order-processing memory is given by PDES algorithms, notably Jefferson [10]. The algorithm for deterministic order-preserving memory for loops with Lookahead has already been described.

Thus, to summarize, the computer has an order-preserving memory. Studies have shown that the vast majority of loops fall into the category of loops with Lookahead. Data dependency patterns of such sequential programs are given by a computable function called the lookahead function, used by the active memory to predict dependencies at run time. In Fortran programs, an example of this is the dynamic array subscript.

As a consequence of this, the compiler is arranged to produce two streams of code, one for the processor nodes and one for the memory nodes, shown in FIG. 13(b), and shown both as "P . . . " in FIG. 1. This is shown in FIG. 12(a), a generalised model of a processor code, and FIG. 12(b), a generalised model of the corresponding active memory code. As described above with reference to FIGS. 9(a) and 9(b), the code for the memory nodes consists of program control structures, remote memory access operations and the Lookahead functions (all other "local" computations are omitted from the memory code). A Lookahead function associated with a remote memory access is used to determine which memory cell will be affected by the anticipated remote access operation.

As a consequence also, "Read request" messages no longer need to be sent by the processing nodes to the memory or memories. The memory is capable of anticipating a Read request and will dispatch the data value as soon as it becomes available. This has the advantage of reducing significantly communication latency.

By way of example, event scheduling in the memory is illustrated with reference to FIGS. 13(a), 13(b), 14 and 15 for lookahead functions f(i, . . . ) and g(i, . . . ).

FIG. 13(a) is a diagram of part of the VVM of FIG. 1 showing nodes $N_1$ to $N_n$ as a network of processing elements, and code comprising a router and a scheduler. The router is a time-space distributer-router mechanism which is responsible for the initial allocation of code and data to the processor and memory nodes and for delivery of messages during execution. FIG. 13(b) is a diagram equivalent to that of FIG. 13(a), showing the n nodes divided into M processor nodes $P_1$ to $P_M$, as nodes $N_1$ to $N_M$, and (n–M) memory nodes $N_{M+1}$ to $N_n$.

FIGS. 14 and 15 illustrate the event scheduling in the memory of read and write events occurring in a segment of code comprising a sequential loop, parallelised to two interleaving parallel loops. FIG. 14 shows the read events R, A [f(i)] and the write events W, A [g(i)] occurring at memory addresses A[ ], with reference to the Lookahead functions f(i) and g(i) which here are given array subscripts (2,3,1,1) and (2,1,4,3) respectively. On the right-hand side of FIG. 14 there is a complete list of the shared memory access events for the two parallel loops. Each sheet is completely defined in space-time coordinates by its four attributes, arranged horizontally in the list: OP—type of event (e.g. read or write); space—the memory address (location) to which the event relates; time—the time of its occurrence; and content—the data value or content.

The same array values are given to the Lookahead functions mem.f(i) and mem.g(i) for event scheduling in the order-preserving (self-ordering) active memory, shown in FIG. 15. The pre-scheduling of events, as mem.R, A[(f(i)] and mem.W, A[g(i)], results in the "pre-read" and "pre-write" events, or potential events, shown as [R, (space), (time), (content)] and [PW, (space), (time), (content)] respectively in FIG. 15.

In the simplest case, mem. f(i) and mem. g(i) would equal f(i) and g(i). However, for massively parallel computing, greater efficiency can be achieved by means of a space-time transformation applied to f(i) and g(i), before loop entry during execution. Note that in f(i), i is the iteration counter of the loop which represents time, while the solution of f(i) gives the subscript of the given array, and therefore represents space. The solution of an indirection function is a value for the array subscript, and in a single loop the iteration counter represents time. So the indirection function is expressed as: S=f(t).

At processing nodes, time changes from one iteration to the next. Time is known, as the value of the iteration counter, and it is space which needs to be determined. In the memory nodes, the converse is true. Each memory node holds an arbitrary element of the space, and what is required is the time at which that element may or may not be affected by a read or write event instigated by the loop for which the skeleton has been created in memory. Rather than searching repeatedly over time, in the same way that the processor would during execution, and determining whether the affected location or space is held in the given memory node, it is more efficient to convert the time-to-space function (used in the processor) to a space-to-time function:

$t=\bar{f}(s)$ so that active memory can go through the list of its resident elements and find out whether or not the given element will be affected and if so at which time. For example, consider the time-to-space function $S=ai+b$ in the case of a Write event to A[ai+b]. That function can be transformed to: i=(s–b)/a. Take for example a memory with an array A of (n+1) elements distributed thus:

| A[0] | A[1] | A[2] | A[3] |
|------|------|------|------|
| A[4] | A[5] | A[6] | A[7] |
| ..... | ..... | ..... | ..... |
| ..... | ..... | ..... | ..... |
| A n–3 | A n–2 | A n–1 | An |
| $M_0$ | $M_1$ | $M_2$ | $M_3$ |

The subscripts are substituted for "S" in i=(S–b)/a to determine i, and if this value of i is found to be integral then it is assumed at that time that the element A[S] would be written to with the time stamp of i. A similar kind of transformation can be applied to the time-to-space functions which are given in the form of a secondary array such as in A[B[i]]. The time-space transformation for such indirection arrays can be computed during execution, prior to loop execution as an intermediate processing stage, using well-known parallel-associative search and sort algorithms (for all discrete functions, it is known that there exists an inverse function).

The router, for its initial allocation of code and data to nodes, has knowledge of the locations of the code and data, i.e. a routing table. This routing table is used during execution of the program to route messages to their destinations, illustrated schematically in FIG. 13(b).

FIG. 16 is a diagram of state transitions of a task process, with its own "process-clock" or "p-clock", in the VVM machine. A Process-clock is in one of three states: 1) Ready-To-Run, 2) Running and 3) Suspended. A Process-clock owns its own private data. To read or write shared data, a p-clock presents a time-stamped message to the router. If the message is of the "write" type, the p-clock continues without interruption. The router looks after the delivery of the message to the stated data location. If the message is of "read" type, then two possible scenarios may occur: 1) if the requested value has already arrived then the value is passed to the p-clock and the p-clock continues execution; but 2) if the requested value (identified by its space-time identifiers) has not yet arrived, then the p-clock will be suspended on the given space-time identified value. Suspended p-clocks are queued in a suspended p-clock list. Now the next p-clock, in front of the Ready-To-Run queue, will be executed. When the executed value for a p-clock in the suspended queue arrives, then that p-clock is moved to the ready-to-run queue. Since sequential programs have a totally ordered set of computation steps, the clock values across the entire execution space are unique. Thus there is a unique computation step for each given uniquely —time-stamped value message, and the value messages effectively identify the computation steps to which they belong. They are therefore used by the router to route each value message in response to an anticipated read request message to its correct destination. The memory node passes the value message, in response to an anticipated read request message ("pre-read"), to the router. Using the time-stamp of the value message, the router identifies the p-clock to which the message is to be delivered.

The invention could be exploited to provide faster execution of existing sequential programs for any purpose including those suggested in the first paragraph of page 1. For example, it may be used in data processing apparatus as part of a digital switching network e.g. a telephone exchange or other telecommunications apparatus for the transfer of data representing sounds or images.

The subject-matter of the present invention is also disclosed in references [18] and [19].

REFERENCES

[1] Allen, R., Callahan, D., and Kennedy, K., "Automatic Decomposition of Scientific Programs for Parallel Execution", Proceedings of the 14th Annual ACM Symp. on Principles of Programming Languages, pp 63–76, January 1987.

[2] Wolfe, M., Banerjee, U., "Data Dependence and its Application to Parallel Processing", International Journal of Parallel Programming 16, 2, April 1987.

[3] Lee, F., "Partitioning of Regular Computations on Multiprocessor Systems", Journal of Parallel and Distributed Computing 9, 1990.

[4] Lewis, T. G., El-Rewini, H., "Introduction to Parallel Computing", Prentice-Hall International, 1992, pp 313–347.

[5] Barth, J. M., "A Practical Interprocedural Data Flow Analysis Algorithm", CACM21(9), September 1978.

[6] Appelby, W. F., and McDowell, C., "Anomaly Detection in Parallel Fortran Programs", Proceedings Workshop on Parallel Processing Using the HEP, May 1985.

[7] Lubeck, O. M., et al., "LosAlamos Experiences with the HEP Computer", in Parallel MIMD Computation: HEP Supercomputer and Its Applications, MIT Press, Cambridge, Mass., 1985.

[8] Fujimoto, R. M., "Parallel Discrete Event Simulation", CACM, Vol 33, No 10 Oct 1990, pp 20–53.

[9] Chandy, K. M., and Misra, J., "Asynchronous Distributed Simulation via a Sequence of Parallel Computations", Commun. ACM 24, 11, Nov 1981, pp 198–205.

[10] Jefferson, D. R., 1985. "Virtual time" ACM Trans. Prog. Lang. and Syst. 7, 3 (Jul), pp 404–425.

[11] Kalantery, N., Winter, S. C., Redfern, A. P., and Wilson, D. R., "Fast Parallel Simulation OF SS7 Telecommunication Networks", Proceedings of 1993 SCS Western Multiconference on Computer Simulation, San Diego, USA, Jan 1993.

[12] Kalantery, N., Winter, S. C., Redfern, A. P., and Wilson, D. R., "Performance Visualisation of Conservative and Time-Warp Based Parallel Simulators", Proceedings of the European Simulation Multiconference, 1992.

[13] Li,Z., Yew, P. C., Zhu, C. Q., "Data Dependence Analysis on Multidimensional Array References", ACM International conference on Supercomputing, July 1989.

[14] Li,Z., Yew, P. C., "Interprocedural Analysis for Parallel Computing", Proceedings of 1988 ICPP, Vol. 11, pp.221–228.

[15] Polychronopoulos, C. D., "Loop Coalescing: A Compiler Transformation for Parallel Machine", Proceedings of the 1987 International Conference on Parallel Processing, 1987.

[16] Shen, z., Li, Z. and Yew, Pen-Cheung, "An Empirical Study of Fortran Programs for Parallelizing Compilers", I.E.E.E. Transactions on Parallel and Distributed Systems, Vol.1, No. 3, July 1990, pages 356 et seq.

[17] Borensztein, P., Labarta J. and Barrado C., "Measure of Parallelism at Compile Time", Proc. of Euromico Workshop on Parallel and Distributed Processing, Jan. 1993.

[18] N. Kalantery et al, "Deterministic Parallel Execution of Sequential Code", Proceedings of Euromicro Workshop on Parallel & Distributed Processing, Malaga, Spain, Jan. 1994.

[19] N. Kalantery et al, "From BSP to a Virtual Von Neumann Parallel Computer", Proceedings of British Computer Society Parallel Specialist Group, one day open meeting, Dec. 1993.

I claim:

1. Data processing apparatus for the execution of a sequential program, comprising at least one memory and a plurality of parallel processors all connected for mutual transfer of messages under the control of a control system; in which the processors are programmed each with part of the sequential program, those steps of each part, which would access or modify a data variable, being serially labelled in accordance with the intended sequence of the whole sequential program; in which the control system is arranged so as to label every message intended to access or modify the memory with a label corresponding to the serial label of the program step from which the message is derived; and in which the control system is arranged, for said at least one memory, to allow memory-accessing and -modifying operations only in the sequential order of the serial labels on the messages.

2. A method of executing a sequential program, comprising:

labelling those steps of the sequential program, which would access or modify a data variable, with a serial label in accordance with the intended sequence of the program;

parallelising the sequential program to derive a plurality of separate program segments, each step of which segments, which would access or modify a data variable, having a serial label corresponding to the serial label of that step in the original sequential program; and running the program segments in parallel on parallel processors under a control system which ensures that all memory-accessing and -modifying operations are executed only in the sequential order of the serial labels on the corresponding steps.

3. Data processing apparatus for parallelising compilation of a sequential program, comprising means for reading the program code, a counter for applying a serial label to each statement of the program code which would access or modify a data variable, the label being indicative of its intended order of execution, and storing the label with the statement, means for decomposing the program into code segments intended for execution by respective parallel processors, according to predetermined parallelisation algorithms stored in the data processing apparatus, and output means for providing as an output the serially-labelled code segments suitable for execution, in parallel by processors controlled to respect the serial-labelling at every memory unit which might be accessed or modified when the parallel processors run the code segments, allowing memory-accessing or modifying operations only on the sequential order of the serial labels on the originating statement.

4. A method of compiling a sequential program for execution by parallel processors, comprising reading the program code, applying a serial label to each statement of the program code which would access or modify a data variable, the label being indicative of its intended order of execution, and storing the label with the statement, decomposing the program into code segments intended for execution by respective parallel processors, according to predetermined parallelisation algorithms stored in the data processing apparatus, and providing as an output the serially-labelled code segments suitable for execution, in parallel using processors controlled to respect the serial-labelling at every memory unit which might be accessed or modified when the parallel processors run the code segments, allowing memory-accessing or modifying operations only in the sequential order of the serial labels on the originating statement.

5. A method of parallel computation in which the program code, executed in local parallel processors accessing and modifying one or more global memories, includes a serial label associated with each code statement which would access or modify a data variable, the label being representative of the sequential order of execution of that statement in an equivalent sequential program which would always produce the same results as the parallel computation, comprising, for each global memory, reading the serial labels of all the messages from the processors instructing access or modification of the memory, and allowing such access or modification only in the sequence of the serial labels, irrespective of the actual time of receipt of such messages.

6. A parallel computation system comprising parallel processors storing their own program code which may access and modify one or more memories common to two or more processors, a serial label being stored in association with each statement of the program code which would access or modify a data variable, the label being representative of the sequential order of execution of that statement in an equivalent sequential program which would always produce the same results as the parallel computation; and a control system arranged, for each common memory, to read the serial labels of all the messages from the processors instructing access or modification of the memory, and for ensuring their execution only in the sequence of the serial labels, irrespective of the actual time of receipt of such messages.

7. Apparatus according to claim 1 or 3, or a system according to claim 6, comprising an active order-preserving memory for exploiting indirection functions to pre-schedule read and write operations into their respective locations, and means for sending run-time-determined parameters of such indirection functions at appropriate points during the program execution when these parameters become known, to the order-preserving memory to start execution of the skeleton of the code which would access or modify data variables, whereby a more efficient parallel execution is achieved than without such indirection functions, whilst preserving the proper sequence of tasks.

8. Apparatus according to claim 7, in which the control system comprises means for exchanging the labelled messages between the order-preserving memory and the processor nodes during execution, once the run-time parameters of the indirection functions required for that execution have been stored in the order-preserving memory and the processor nodes.

9. Apparatus according to claim 7, in which the control system comprises means for performing a time-space transformation on the indirection functions in the order-preserving memory during execution but before the execution of corresponding loops.

10. A method according to claim 2, 4 or 5, comprising executing indirection functions in an active memory, once the required parameters become available, and thereby anticipating and pre-scheduling read and write operations on the resident data.

11. A method according to claim 10, comprising performing a time-space transformation on the indirection functions in the order-preserving memory during execution but before the execution of corresponding loops.

12. Data processing apparatus or a method according to any of claims 1 to 6, in which the parallel processing is asynchronous.

13. Data processing apparatus or a method according to any of claims 1 to 6, in which the parallel processors are shared memory machines.

14. Data processing apparatus or a method according to any of claims 1 to 6, in which the parallel processors are distributed memory machines.

15. A system according to claim 6, in which the parallel processors are transputers.

16. Telecommunications apparatus for the transfer of data representing sounds or images, comprising data processing apparatus or a system according to claim 1, 3 or 6, in which the sequential program is a conventional program for controlling such transfer.

17. Telecommunications apparatus according to claim 16, in the form of a digital telephone exchange.

* * * * *